Patented Apr. 12, 1932

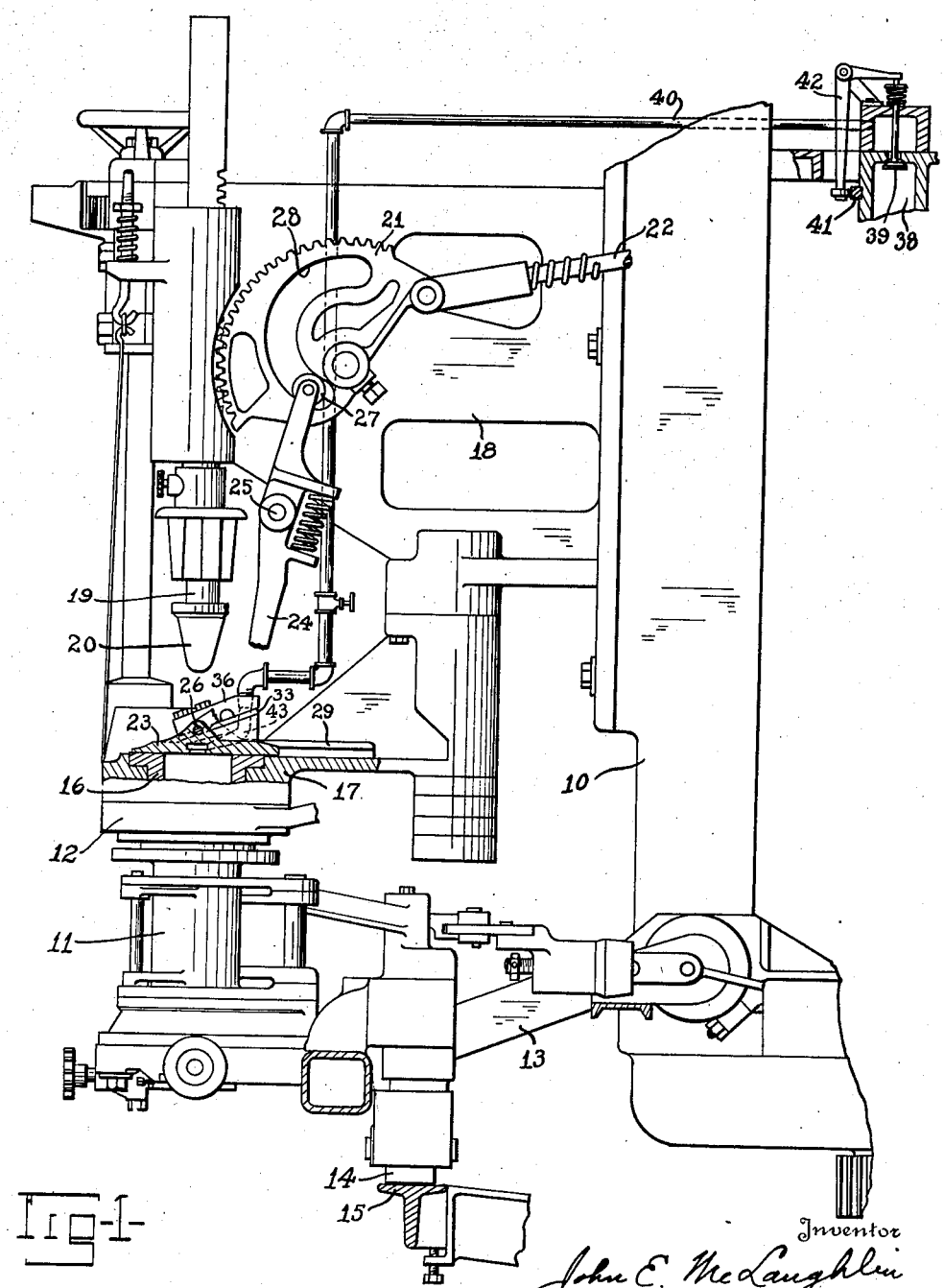

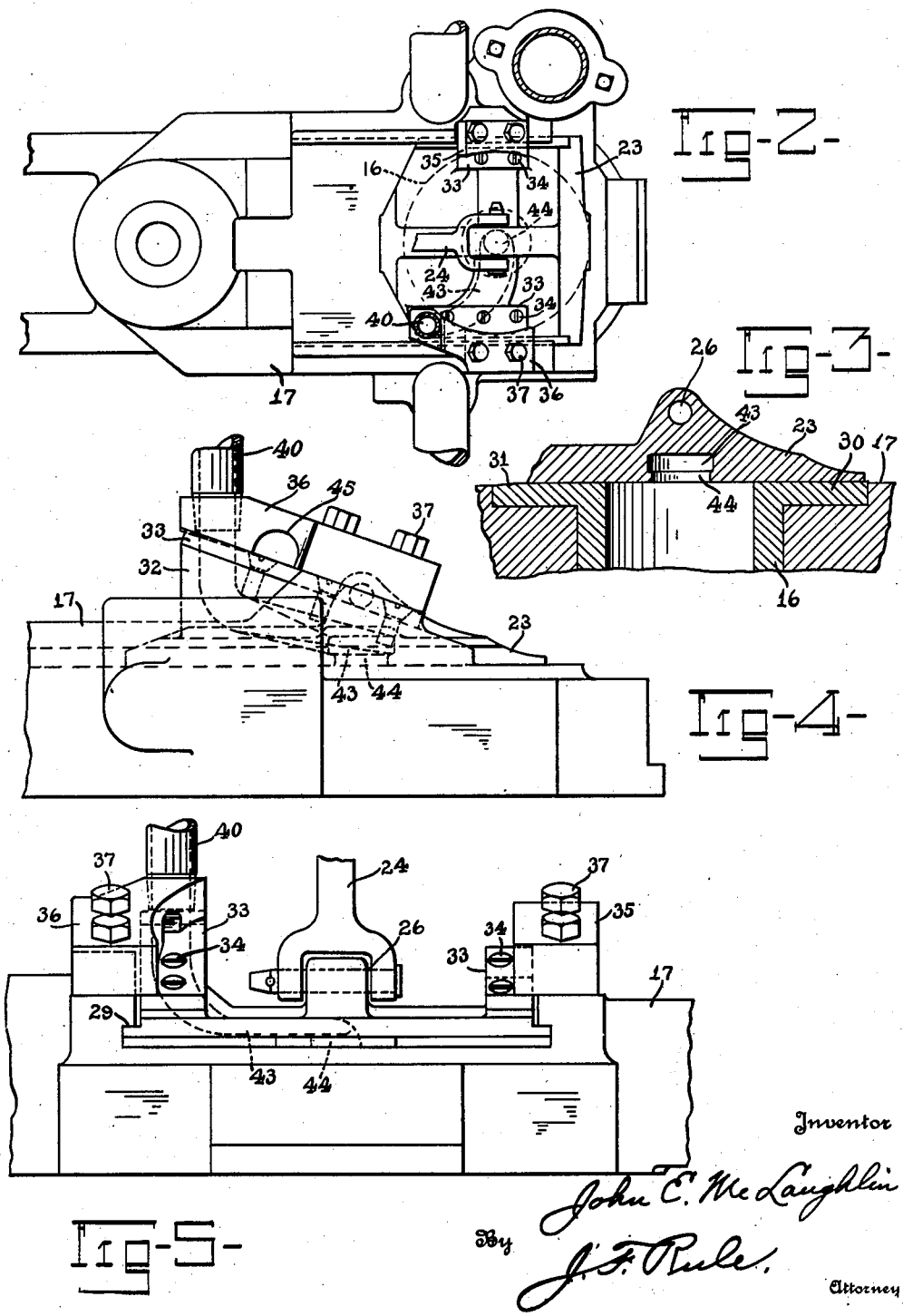

1,853,986

UNITED STATES PATENT OFFICE

JOHN E. McLAUGHLIN, OF TOLEDO, OHIO, ASSIGNOR TO OWENS-ILLINOIS GLASS COMPANY, OF TOLEDO, OHIO, A CORPORATION OF OHIO

MACHINE FOR FORMING GLASS ARTICLES

Application filed April 29, 1929. Serial No. 358,877.

My invention relates to machines for blowing glass articles in molds and has particular reference to apparatus for controlling and directing the air under pressure supplied to the molds for blowing the articles therein. The invention is herein disclosed as adapted to a machine of the Owens suction type such as shown, for example, in the patent to La France, Number 1,185,687, June 6, 1916. In machines of this type, the initial blow opening in the parison is formed by a plunger which projects downwardly through a mold supporting head into the neck mold while the charge of glass is drawn by suction into the mold. After the parison has been formed in the blank mold the plunger is withdrawn, the blank mold opened and a finishing mold closed around the parison. Air for blowing the parison in the finishing mold is supplied through an air line including a slide block which, after the plunger is withdrawn, is moved into position over the mold. The air line extends through the mold supporting head to said slide block and from the slide block through the opening in the supporting head from which the plunger has been withdrawn. This construction allows considerable leakage of air unless the parts are very carefully fitted and machined. The wear of parts also introduces considerable leakage after a short time even when the parts are accurately adjusted in the first place.

An object of the present invention is to overcome this difficulty and to this end the air line is connected directly to the slide block or plate and the parts so constructed that leakage at the slide block can be practically eliminated.

Other objects of the invention will appear hereinafter in connection with the detailed description of the construction, and various features of novelty will be pointed out.

In the accompanying drawings:

Fig. 1 is a sectional side elevation showing a portion of the machine to which the present invention is applied.

Fig. 2 is a top plan view of the slide block and associated parts.

Fig. 3 is a fragmentary sectional elevation showing the slide block in its operative position over the neck mold adapter.

Fig. 4 is a side elevation of the parts shown in Fig. 2.

Fig. 5 is a front elevation of the same.

The invention is herein shown as embodied in a suction gathering machine comprising the usual rotating mold carriage 10 on which are mounted finishing molds 11, neck molds 12 and blank molds (not shown). Each finishing mold 11 is carried on a vertically swinging frame 13 having a roll 14 running on a cam track 15 which controls the up and down movements of the mold frame. The neck mold 12 may be of usual construction comprisng partible sections adapted to close around a tubular bearing member or adapter 16 which is seated in a head or bracket 17 forming part of the usual dip head or frame 18 which supports the blank mold. A plunger 19 provided with a tip 20 for forming the initial blow opening in the blank of glass, is reciprocated vertically by a segmental gear 21 engaging rack teeth on the plunger rod. The gear 21 is actuated in the usual manner by a stationary cam (not shown) operating through connections comprising a link 22.

A slide block 23 is reciprocated horizontally in a direction radial to the mold carriage, by an actuating lever 24 pivotally connected at 25 to the dip frame. The lower end of the lever is pivoted at 26 to the slide block, and the upper end of the lever carries a roll 27 running in a cam slot 28 in the gear segment 21. The valve block 23 is guided in its reciprocating movements by guideways 29. The neck mold adapter 16 is formed with an annular flange 30 which seats in a corresponding recess formed in the upper surface of the head 17. The upper surface of the adapter is preferably slightly higher than the surrounding surface of the plate 17 to permit ordinary wear without lowering the adapter surface below that of the plate 17. The portion 31 (Fig. 3) of the surface of the flange 30 nearest the center of the machine is preferably slightly inclined so that the edge which adjoins the surface of the plate 17 is flush therewith, thus permitting the slide block 23 to move across said surfaces without interference.

The slide block 23 is provided at opposite sides with elevations 32, the upper surfaces of which are downwardly and outwardly inclined. Wear plates 33 are secured by screws 34 to the upper inclined faces of the parts 32. Bearing blocks 35 and 36 are secured by bolts 37 to the supporting bracket 17 at opposite sides of the slide 23. Said bearing blocks are arranged to overhang the raised portions 32, and the under surfaces of said blocks are inclined at substantially the same angle as the bearing surfaces of the plates 33.

Air for blowing the parison in the finishing mold is supplied from an air pressure chamber 38 (Fig. 1) in the mold carriage. A valve 39 controls the supply of air from said chamber to an air pressure pipe 40 leading to a port in the bearing block 36. The valve 39 is actuated by a cam 41 operating through a bell crank lever 42, the cam being so shaped that the valve is held open only while the slide block 23 is in operative position over the mold. When the valve block 23 is in its operative position, as shown in the drawings, an air passageway 43 extending therethrough is in register at its upper end with the port in the bearing block 36 and communicates through said port with the air line 40. The inner or lower end of the passageway 43 terminates at the center of the valve block in an opening 44 in the lower face of said block. It will thus be seen that when the valve block 23 is seated on the adapter 16 (Fig. 3) communication is established from the air pressure chamber 38 through the pipe 40, valve block 23 and neck mold adapter to the mold, so that air under pressure is supplied for blowing the glass in the mold. The bearing block 36 is cut away or provided with a recess 45 to give a certain amount of resiliency to the upper or inner end of said block so that when the valve block 23 is projected beneath said bearing block the latter may yield upward slightly, permitting an air tight connection to be effected at the meeting faces of the block 36 and bearing plate 33.

The operation may be stated as follows:

After a parison has been formed in the blank mold, the gear segment 21 is operated in the usual manner to lift the plunger and withdraw the tip 20 from the neck mold to a position above the path of the slide block 23. The cam 28 is shaped to slide the block 23 radially outward after the plunger tip has been withdrawn, thereby bringing the block 23 over the adapter 16, wedging it beneath the bearing blocks 35 and 36, so that the slide block is clamped firmly against the upper face of the adapter, making a substantially air tight connection. At the same time, the upper end of the passageway 43 which extends through the bearing block is brought into register with the port in the bearing block 36, and the parts being wedged together make a tight connection at this point also, so that leakage is substantially eliminated. The valve 39 (Fig. 1) is now opened by its cam 41, admitting air through the line 40 for blowing the parison in the finishing mold 11.

Modifications may be resorted to within the spirit and scope of my invention.

What I claim is:

1. In a machine for forming hollow glass articles, the combination of a mold, a valve block having its upper and lower faces in divergent planes, means for sliding said block into an operative position over the mold, said block having a passageway extending therethrough and terminating at its opposite ends in said divergent faces, a bearing plate to engage the upper face of the valve block when in said operative position, said bearing plate having a port in register with said passageway, and means for supplying air under pressure through said port and passageway.

2. The combination of a mold, a valve block slidable horizontally into and out of an operative position over the mold, said block having its upper face inclined to the horizontal, and a bearing block having a correspondingly inclined lower face positioned to engage said inclined face of the valve block when the latter is over the mold, said valve block and bearing block being formed with air passageways extending therethrough and in register when the valve block is in said operative position.

3. The combination of a mold, a valve block slidable horizontally into and out of an operative position over the mold, said block having its upper face inclined to the horizontal, a bearing block having a correspondingly inclined lower face positioned to engage said inclined face of the valve block when the latter is over the mold, said valve block and bearing block being formed with air passageways extending therethrough and in register when the valve block is in said operative position, an air pressure chamber, an air line extending from said chamber to the passageway in said bearing block, a valve in said air line, and automatic means for actuating said valve in synchronism with the movements of the valve block.

Signed at Toledo, Ohio, this 27th day of April 1929.

JOHN E. McLAUGHLIN.